(12) United States Patent
Guo (10) Patent No.: US 9,885,324 B2
(45) Date of Patent: Feb. 6, 2018

(54) EFFICIENT THERMAL ENERGY POWER ENGINE AND WORKING METHOD THEREOF

(71) Applicant: Yuanjun Guo, Yongzhou (CN)

(72) Inventor: Yuanjun Guo, Yongzhou (CN)

(73) Assignee: Yuanjun Guo, Yongzhou (CN)

( * ) Notice: Subject to any disclaimer, the term of this patent is extended or adjusted under 35 U.S.C. 154(b) by 0 days.

(21) Appl. No.: 15/323,964

(22) PCT Filed: Dec. 5, 2014

(86) PCT No.: PCT/CN2014/093121
§ 371 (c)(1),
(2) Date: Jan. 4, 2017

(87) PCT Pub. No.: WO2016/000401
PCT Pub. Date: Jan. 7, 2016

(65) Prior Publication Data
US 2017/0184061 A1    Jun. 29, 2017

(30) Foreign Application Priority Data

Jul. 4, 2014    (CN) .......................... 2014 1 03140507

(51) Int. Cl.
*F02M 31/18* (2006.01)
*F02B 43/04* (2006.01)
(Continued)

(52) U.S. Cl.
CPC .............. *F02M 31/18* (2013.01); *F01N 5/02* (2013.01); *F02B 43/04* (2013.01); *F02B 75/021* (2013.01)

(58) Field of Classification Search
CPC ........... F01N 3/2066; F01N 2610/1453; F01N 13/009; F01N 3/0814
See application file for complete search history.

(56) References Cited

U.S. PATENT DOCUMENTS 4,475,484 A * 10/1984 Filho .................... F01N 5/02
123/1 A
2010/0268443 A1 * 10/2010 Gurin ................. F02D 41/0025
701/103

(Continued)

FOREIGN PATENT DOCUMENTS

CN            87102463 A       10/1988
CN            1305053 A        7/2001
(Continued)

*Primary Examiner* — Long T Tran
(74) *Attorney, Agent, or Firm* — Gokalp Bayramoglu (57) ABSTRACT

An efficient thermal energy power engine is disclosed. A gasification reactor is arranged on a cylinder head of an internal combustion engine. Gasifying plates are arranged with gaps on the cylinder head. An upper portion of the gasification reactor is connected to an atomizer. The atomizer is connected to a pressure pump via a pipe. The pressure pump is connected to a liquid storage tank via a pipe. The liquid storage tank is connected to a cooler via a pipe. The cooler is connected to an exhaust passage via a pipe. Heat absorption plates are arranged inside the exhaust passage in parallel in an air flow direction. The heat absorption plates absorb thermal energy of exhaust gas and transfer the thermal energy to the gasification reactor. The cylinder body of the internal combustion engine is wrapped with an insulation layer.

16 Claims, 3 Drawing Sheets (51) Int. Cl.
*F02B 75/02* (2006.01)
*F01N 5/02* (2006.01)

(56) References Cited

U.S. PATENT DOCUMENTS

| | | | | |
|---|---|---|---|---|
| 2011/0283705 A1* | 11/2011 | Oliver | ............ | F42D 3/00 |
| | | | | 60/698 |
| 2013/0121886 A1* | 5/2013 | Nakano | ............ | F01N 3/2033 |
| | | | | 422/173 |
| 2014/0178264 A1* | 6/2014 | Floyd | ............ | F01N 3/2066 |
| | | | | 422/176 |

FOREIGN PATENT DOCUMENTS

| CN | 101737156 A | 6/2010 |
|---|---|---|
| CN | 104088720 A | 10/2014 |
| CN | 204082379 U | 1/2015 |

\* cited by examiner

EFFICIENT THERMAL ENERGY POWER ENGINE AND WORKING METHOD THEREOF

CROSS REFERENCE

This application is a national phase application of PCT/CN2014/093121 filed on Dec. 5, 2014, which claims priority to a Chinese application CN2014103140507 filed on Jul. 4, 2014, the entire contents of which are incorporated herein by reference.

TECHNICAL FIELD

The present invention relates to the field of thermal energy power apparatus, particularly relates to the thermal energy power apparatus which uses the thermal energy of the internal combustion engine to convert the thermal energy into kinetic energy.

BACKGROUND

Each working cycle of a four-stroke engine is composed of an intake stroke, a compression stroke, a working stroke, and an exhaust stroke. For a four-stroke engine, in order to complete a working cycle, the piston in the cylinder needs to travel four times back and forth (i.e., the crankshaft turns twice). The four-stroke engine is further divided into four-stroke gasoline engine and four-stroke diesel engine. The main difference between these two kinds of the four-stroke engines is the ignition mode. The gasoline engine uses a spark plug ignition, while the diesel engine uses a compression ignition.

The four-stroke engine belongs to the reciprocating piston internal combustion engine, which can be divided into three types—a gasoline engine, a diesel engine, and a gaseous fuel engine according to different types of fuel being used. The reciprocating piston internal combustion engine which uses gasoline or diesel as fuel is called the gasoline engine and the diesel engine respectively. The reciprocating piston internal combustion engines that use natural gas, liquefied petroleum gas, and other gaseous fuel are called the gaseous fuel engine. Gasoline and diesel are both petroleum products, and are traditional fuels for the automobile engine. Non-petroleum fuel is called substitute fuel. The engine which uses the substitute fuel is called substitute fuel engine, such as the ethanol engine, the hydrogen engine, the methanol engine etc.

In view of the heat balance of the current automobile engine, the power for power outputting generally accounts for only 30%-45% (diesel engine) or 20%-30% (gasoline engine) of the total heat of fuel combustion. The power which is discharged as residual heat out of the automobile accounts for 55%-70% (diesel engine) or 70%-80% (gasoline engine), mainly includes the heat taken away by recirculating cooling water and the heat taken away by exhaust gas. The following table 1 is a heat balance table of internal combustion engine.

TABLE 1

Heat balance table of internal combustion engine

| items of thermal balance % | gasoline engine | high-speed diesel engine | middle-speed diesel engine |
|---|---|---|---|
| heat of heat balance of effective work | 20-30 | 30-40 | 35-45 |
| heat taken away by coolant | 25-30 | 20-25 | 10-20 |
| heat taken away by exhaust gas | 40-45 | 35-40 | 30-40 |
| other heat loss | 5-10 | 5-10 | 10-15 |

The gasoline engine makes good mixture gas by mixing air with gasoline at a certain ratio. The mixture gas is inhaled into a cylinder during the intake stroke. Then the mixture gas is compressed and ignited to burn to generate thermal energy. The gas with high temperature and high pressure acts on the top of the piston to push the piston to perform reciprocating linear motion, outputting mechanical energy externally through a connecting rod, a crankshaft, and a flywheel. The four-stroke gasoline engine accomplishes an intake stroke, a compression stroke, a working stroke, and an exhaust stroke within a working cycle.

Intake stroke: the piston is driven by the crankshaft to move from the top dead center (TDC) to the bottom dead center (BDC). An intake valve opens at this moment, an exhaust valve is closed, and a crankshaft rotates 180°. During the movement of the piston, the volume of the cylinder is gradually increased. The pressure of the gas in the cylinder is gradually decreased from pr to pa to form a certain vacuum degree. Mixture gas of air and gasoline is inhaled into the cylinder through the intake valve, and is further mixed in the cylinder to form a combustible mixture gas. Since the intake system has resistance, at the intake end point (point A in the figure), the pressure of the gas in the cylinder is less than atmospheric pressure 0p, that is, pa= (0.80-0.90) 0p. The temperature of the combustible mixture gas entered into the cylinder is increased to 340-400K, because the combustible mixture gas is heated by high-temperature parts such as the intake pipe, the cylinder wall, the piston head, valves, the combustion chamber wall and etc., and is mixed with the residual exhaust gas.

Compression stroke: in the compression stroke, the intake valve and the exhaust valve are both closed. The piston moves from the BDC to the TDC, and the crankshaft rotates 180°. When the piston is moving upward, the working volume is reduced gradually. The pressure and the temperature of the mixture gas in the cylinder are constantly increased after the compression. When the compression end point is reached, the pressure pc of the mixture gas can reach 800-2000 kPa, and the temperature of the mixture gas reach 600-750K. In the indicator diagram, the curves of the compression stroke are curves a-c.

Working stroke: when the piston approaches TDC, the combustible mixture gas is ignited by the spark plug. The combustible mixture gas burns and releases a lot of heat, causing the pressure and temperature of the gas in the cylinder to increase rapidly. The maximum combustion pressure pZ reaches 3000-6000 kPa, and the temperature TZ reaches 2200-2800K. The gas with high temperature and high pressure pushes the piston to move from the TDC to the BDC, and outputs the mechanical energy externally through a crank and connecting rod mechanism. With the piston moving downward, the volume of the cylinder is increased, and the pressure and temperature of the gas are reduced gradually. When b point is reached, the pressure of the gas is reduced to 300-500 kPa, and the temperature is reduced to 1200-1500K. In the working stroke, the intake valve and the exhaust valve are both closed, and the crankshaft rotates 180°. In the indicator diagram, the curves of the working stroke are curves c-Z-b.

Exhaust stroke: in the exhaust stroke, the exhaust valve is open, and the intake valve is still closed. The piston moves from the BDC to the TDC, and the crankshaft rotates 180°. When the exhaust valve is open, on one hand, the burned exhaust gas is discharged out of the cylinder under the effect of the cylinder pressure difference between inside and outside. On the other hand, the burned exhaust gas is discharged out of the cylinder by the pushing-out effect of the piston. Due to the resistant effect of the exhaust system, the pressure at the exhaust end point, r point, is slightly more than the atmospheric pressure, that is, $pr=(1.05-1.20)$ p0. The temperature of the exhaust end point is $Tr=900-1100K$. When the piston comes to the TDC, a certain volume of exhaust gas is left and cannot be discharged. This part of the exhaust gas is called residual exhaust gas.

The four-stroke diesel engine is similar to the gasoline engine. Each working cycle is also composed of an intake stroke, a compression stroke, a working stroke, and an exhaust stroke. Since the diesel engine uses diesel as fuel, compared with the gasoline, the diesel has a low self-ignition temperature, large viscosity, and is hard to volatilize. The diesel engine uses compression end point self-ignition. The working process and system structure of the diesel engine are different from those of the gasoline engine.

Intake stroke: the working medium which enters the cylinder is pure air. Since the resistance of the intake system of the diesel engine is small, the pressure of the intake end point is $pa=(0.85-0.95)$ p0, which is higher than that of the gasoline engine. The temperature of the intake end point is $Ta=300-340K$, which is lower than that of the gasoline engine.

Compression stroke: since the compressed working medium is pure air, the compression ratio of the diesel engine is higher than that of the gasoline engine (generally, $\epsilon=16-22$). The pressure of the compression end point is 3000-5000 kPa. The temperature of the compression end point is 750-1000K, which is greatly more than the self-ignition temperature of the diesel (about 520 K).

Working stroke: when the compression stroke is approaching the end, under the effect of the high pressure oil pump, the diesel is injected with a high pressure of about 10 Mpa to the combustion chamber of the cylinder via a fuel injector. Upon being mixed with the air in a short time, the diesel self-ignites and burns immediately. In the cylinder, the pressure of the gas increases rapidly, reaching up to 5000-9000 kPa. The highest temperature is 1800-2000K. Since the diesel engine self-ignites and burns under compression, the diesel engine is called compression ignition engine.

Exhaust stroke: the exhaust of the diesel engine is basically the same as that of the gasoline engine, only that the exhaust temperature is lower than that of the gasoline engine, generally, $Tr=700-900K$. As for the single-cylinder engine, the rotational speed is nonuniform, the working of the engine is unstable, and the vibration is severe. That is because only one stroke out of the four strokes is working, while the other three strokes are the strokes that consume power to prepare for working. To solve this problem, the flywheel must have sufficiently rotational inertia, which will lead to the increase of the weight and size of the whole engine. Using multi-cylinder engine can offset the above deficiency. Modern automobiles usually use the four-cylinder engine, the six-cylinder engine, and the eight-cylinder engine.

After the cylinder in the above internal combustion engine works, the temperature in the cylinder reaches above 1000K. The high temperature gas is discharged through the exhaust valve, leading to the direct waste of the thermal energy. The temperatures of parts like the inner wall of the cylinder, the piston head, the cylinder head, the valves, etc. are high, which will affect the efficiency of compression stroke. Thus, the cooling system is provided on all the cylinders of the existing engine.

Regarding the utilization of the exhaust gas of the engine, current engines may have a turbo booster. After boosting, the pressure and temperature of the engine are significantly increased during the working. Therefore, the lifetime of the engine will be shorter than that of the engine which has the identical emission without boosting. Furthermore, the mechanical performance and the lubrication performance are both affected. Thus, the application of the turbo boost technology in the engine is limited in a certain degree.

The utilization of the waste heat of the exhaust gas is low. The energy recovery device should resist to the vibration and the shock. The waste heat recovery device of the exhaust gas cannot affect the normal working performance of the engine. Currently, there are several following main methods of using the exhaust gas waste heat of the engine. An exhaust turbocharge uses a part of the energy of the exhaust gas to improve the intake pressure of the internal combustion engine to increase the volume of gas, to improve the power property and economy of the engine. Currently, quite a few automobiles use the method of the turbo boost. However, the method of the turbo boost can only employ a part of the energy of the exhaust gas. Furthermore, there are some problems, for example, the whole working condition of the engine is hard to match, etc.

There are three methods of using the exhaust gas of the engine to generate power, i.e., the thermoelectric power generation, the exhaust gas turbine power generation, and the Polytetrafluoroethylene(PTFE) turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator to generate power. This method of power generation has certain influences on the performance of the engine, which needs further study.

Currently, methods of refrigeration using the waste heat of the exhaust gas of the engine mainly are the absorption refrigeration and the sorption refrigeration. The principle of the absorption refrigeration is that the heat is used as power to accomplish the refrigeration cycle. The sorption refrigeration uses properties of some solid materials, which can absorb a certain gas or steam at a certain temperature and pressure, and can release the gas or steam at another temperature and pressure, to realize refrigeration. According to the present situation of the utilization of the waste heat of the exhaust gas of the engine at home and abroad, a concept of the method of using the waste heat of the exhaust gas of the engine to generate heat and power is provided.

The basic structure of the single-cylinder engine includes a cylinder, a piston, a connecting rod, a crankshaft, a cylinder head, a body, a camshaft, an intake valve, an exhaust valve, a valve spring, and a crankshaft toothed pulley, etc. The working chamber of the reciprocating piston engine is called a cylinder. The internal surface of the cylinder is cylindrical. The piston that performs reciprocating movement in the cylinder is hinged with one end of the connecting rod through a piston pin. The other end of the connecting rod is connected to the crankshaft to form the crank and connecting rod mechanism. When the piston performs reciprocating movements in the cylinder, the crankshaft is pushed to rotate by the connecting rod, or vice versa. At the same time, the volume of the cylinder is continuously changed from small to large, and then from large to small. The cycle is repeated continuously. The top of the cylinder is sealed with the cylinder head. The intake valve and the exhaust valve are mounted on the cylinder head. Through the opening and closing of the intake valve and the exhaust valve, the inflating of the gas into the cylinder and the discharging of the exhaust gas from the cylinder can be achieved. The opening and closing of the intake valve and the exhaust valve are driven by the camshaft. The camshaft is driven by the crankshaft through a toothed belt or a gear. The part which forms the cylinder is called the cylinder body. The crankshaft rotates in the crankcase.

Since the working medium does not burn, the external combustion engine avoids the knocking problem of working of the traditional internal combustion engine. Thus, the external combustion engine achieves a high efficiency, a low noise, a low pollution, and a low running cost. Once the heat chamber reaches 700° C., the apparatus can work and run immediately. The lower the environmental temperature is, the higher the efficiency of power generation is. The most remarkable advantage of the external combustion engine is the output and efficiency are not limited by the altitude, which is suitable to be used in high altitude areas.

At the same time, the main existing problems and defects of the Stirling Engine are as follows. The manufacture cost is high. The sealing technology of working medium is difficult. The reliability and service life of the seal components have problems. The cost of the material is high. The power adjusting and controlling system is complicated. The machine is relatively bulky. The costs of the expansion chamber, the compression chamber, the heater, the cooling chamber, the regenerator, etc. are high. The heat loss is 2-3 times that of the internal combustion engine, etc.

Organic Rankine Cycle system includes a pump, an evaporator, an expander, a generator, a condenser, etc. The heat collector absorbs the solar irradiance, and the temperature of heat exchange medium in the heat collector is increased. The heat exchange medium transfers the heat to the organic medium through the evaporator. The organic medium is heated in the evaporator under a constant pressure. The gaseous organic medium with high pressure enters the expander to work to drive the generator to generate power. The organic medium which is discharged from the end of the expander enters the condenser to condense under a constant pressure. The organic medium from the outlet of the condenser enters the evaporator after being compressed by the pump, to accomplish a generation cycle.

Organic Rankine Cycle system has problems of low conversion efficiency, large volume, and doing work by means of an expander which has a complex structure.

The existing engine, especially, the multi-cylinder engine with a large emission, is noisy.

SUMMARY

The utilization of the exhaust gas in the prior art in the above section of Background is operated outside the cylinder, which needs to be equipped with an entire cycling system. The utilization rate of the residual heat of the exhaust gas is low. The utilization of the waste heat of the exhaust gas is low. The energy recovery device should resist to the vibration and the shock. The waste heat recovery device of the exhaust gas cannot affect the normal working performance of the engine. Currently, there are several following main methods of using the exhaust gas waste heat of the engine. An exhaust turbo booster uses a part of the energy of the exhaust gas to raise the intake pressure of the internal combustion engine to increase the volume of gas, so as to improve the power property and economy of the engine. Currently, quite a few automobiles use the method of the turbo boost. However, the method of the turbo boost can only employ a part of the energy of the exhaust gas. Furthermore, there are problems, for example, the whole working condition of the engine is hard to match, etc. There are three methods of using the exhaust gas of the engine to generate power, i.e., the thermoelectric power generation, the exhaust gas turbine power generation, and the Polytetrafluoroethylene (PTFE) turbine power generation. The thermoelectric power generation mainly uses thermoelectric power generation material to generate power. However, since the energy conversion rate of thermoelectric material is low, it is required that the thermoelectric conversion material with a high energy conversion rate should be developed. The exhaust gas turbine power generation uses the exhaust gas to drive the turbine to make the generator to generate power. This method of power generation has certain influences on the performance of the engine.

Currently, methods of refrigeration using the waste heat of the exhaust gas of the engine mainly are the absorption refrigeration and the sorption refrigeration. The principle of the absorption refrigeration is that the heat is used as power to accomplish the refrigeration cycle. The sorption refrigeration uses properties of some solid materials, which can absorb a certain gas or steam at a certain temperature and pressure, and can release the gas or steam at another temperature and pressure, to realize refrigeration. According to the present situation of the utilization of the waste heat of the exhaust gas from the engine at home and abroad, a concept of the method for using the waste heat of the exhaust gas from the engine to generate heat and power is provided.

The present invention effectively uses the technical characters that the cylinder of the internal combustion engine has high heat, and the cylinder needs to dissipate the heat and exhaust, and takes full advantage of the structure of the internal combustion engine to utilize the heat, such that the thermal energy generated by working is reused to generate mechanical energy. Thus, the problems that costs of the expansion chamber, the compression chamber, the heater, the cooling chamber, the regenerator, etc. of the external combustion engine are high, and that the heat loss of the external combustion engine is 2-3 times that of the internal combustion engine, etc. are overcome. The technical difficulties of the Organic Rankine Cycle system which requires an expander or a gas turbine and has a high manufacture cost, are overcome.

The present invention provides a thermal energy power engine which has a high thermal energy conversion efficiency, recyclable working medium, wherein the thermal energy generated by working in the cylinder can be converted into mechanical energy again.

The technical solution used by the present invention are as follows. An efficient thermal energy power engine includes a gasification reactor, provided on a cylinder head of an internal combustion engine, the gasification reactor including gasifying plates, gas holes on the gasifying plate, and an atomizer above the gasifying plates, provided on the cylinder head, wherein the gasifying plates are provided on the cylinder head with a particular gap, wherein the gas holes are distributed evenly, in an array, or in a staggered arrangement on the gasifying plate, an upper portion of the gasification reactor being connected to the atomizer, the atomizer being connected to a pressure pump through a pipe, the pressure pump being connected to a liquid storage tank through the pipe, the liquid storage tank being connected to a cooler through the pipe, the cooler being connected to an exhaust passage through the pipe; heat absorbing plates, provided in a direction of parallel air flow inside the exhaust passage, the heat absorbing plates absorbing thermal energy from exhaust and passing the thermal energy to the gasification reactor, wherein an internal combustion engine cylinder body is wrapped with an insulation layer.

Further, after the heat absorbing plates are provided inside the exhaust passage, the diameter of the exhaust passage is enlarged, such that an increased resistance to the heat absorbing plates is canceled, maintaining an original exhaust ratio of the cylinder body and the exhaust.

Further, an arrangement of gaps between the heat absorbing plates does not affect an exhausting of an original cylinder.

Further, a gap between the heat absorbing plates being arranged as 1.2-6 mm, a thickness of the heat absorbing plates being 0.2-6 mm.

Further, the cylinder head on the internal combustion engine being provided with at least one layer of gasifying plates.

Further, wherein the gap between the gasifying plates is 1.2-6 mm.

Further, the gas holes in one gasifying plate and the gas holes in another gasifying plate are arranged in a staggered manner.

Further, the cylinder head of the internal combustion engine is provided with three layers of gasifying plates arranged with a particular gap.

Further, the gap between the three layers of gasifying plates arranged with a particular gap being 1.5-3.5 mm.

Further, the size of the gas hole is arranged that a diameter of the gas hole in an upper layer of gasifying plate is half of a diameter of the gas hole in an adjacent lower layer of gasifying plate.

Further, a diameter of the gas hole in the first layer of gasifying plate is half of a diameter of the gas hole in a second layer of gasifying plate, and the diameter of the gas hole in the second layer of gasifying plate is half of a diameter of the gas hole in the third layer of gasifying plate.

Further, the diameter of the gas hole in the first layer of gasifying plate is 0.2-3.5 mm. The diameter of the gas hole in the second layer of gasifying plate is 0.4-7 mm. The diameter of the gas hole in the third layer of gasifying plate is 0.8-14 mm.

The thickness of the gasifying plates is 0.2-6 mm.

Further, the internal combustion engine cylinder body, heat absorbing plate, cylinder head, and gasifying plates are all made of thermally conductive metal material.

The working method of the above efficient thermal energy power engine is that after steps of working or exhausting of an existing engine, an air injection working stroke and an exhaust stroke implemented by the atomizer and the gasifying plates are added.

The six-stroke working method of the above efficient thermal energy power engine is that for a six-stroke engine, each working cycle includes an intake stroke, a compression stroke, a working stroke, and an exhaust stroke, an air injection working stroke, and an exhaust stroke, wherein in order to complete one working cycle of the six-stroke engine, the piston in the cylinder needs to go back and forth in six strokes, and the crankshaft rotates for three times.

In the working method of the above efficient thermal energy power engine, the internal combustion engine can be a gasoline engine, a diesel engine, or a substitute fuel engine; and the internal combustion engine can be a dual-stroke engine, a four-stroke engine, a six-stroke engine, or other stroke engines being added with the air injection working stroke.

In the working method of the above efficient thermal energy power engine, the air injection working stroke is as follows. The working medium is atomized through the atomizer on the cylinder head, and enters the first layer of gasifying plate. Thermal energy passes through the cylinder and the gasifying plate such that the atomized organic working medium is gasified quickly. The atomized gas and the gasified working medium enter the second layer of gasifying plate to be gasified continuously. After a certain air pressure is formed, the atomized gas and the gasified working medium enter a third layer of gasifying plate and are gasified continuously so as to push the piston to work. Since a diameter of the gas hole increases layer by layer from the first layer to the third layer, an expanding rate of gaseous organic working medium speeds up step by step, and an air pressure increases gradually, pushing the piston to work again. After working, the piston pushes the exhaust to discharge.

Existing internal combustion engine does work by the compression and expansion of the fuel. A large amount of thermal energy generated by burning is discharged by the exhaust. The present invention absorbs 45%-95% of the high-temperature thermal energy of the exhaust gas by providing the heat absorbing plate in the exhaust passage, so as to heat the cylinder body. The thermal energy is provided for the gasification of the atomized working medium in the gasification reactor. The thermal energy is utilized effectively. Under the condition that the working of the internal combustion engine is not affected, a working stroke is added.

Advantages of the present invention are as below. The added stroke reduces the temperature of the cylinder body. The compression ratio is high. Since the exhaust gas is filtered by the cooler and the liquid storage tank, the discharged exhaust gas is more environmentally friendly compared with existing engines. After the temperature of the cylinder body is reduced, the discharged exhaust gas is filtered by the cooler and the liquid storage tank without noise. A working stroke is added. The utilization rate of the thermal energy is improved by 20-95. The thermal energy utilization occurs in the exhaust passage directly, removing heat dissipating water tank.

In the drawings: 1 is cylinder body; 2 is piston; 3 is piston ring; 4 is connecting rod; 5 is crankshaft; 6 is air inlet passage; 7 is intake valve; 8 is exhaust passage; 9 is gasification reactor; 10 is atomizer; 11 is cooler; 12 is liquid storage tank; 13 is exhaust port; 14 is exhaust valve; 15 is working medium; 16 is pressure pump; 17 is pipe; 18 is cylinder head; 19 is gasifying plate; 20 is gas hole; 21 is combustion chamber; 22 is heat absorbing plate.

DETAILED DESCRIPTION

Embodiments of the present invention are described in further details with reference to FIGS. 1-4.

Embodiment 1

Figure 1:
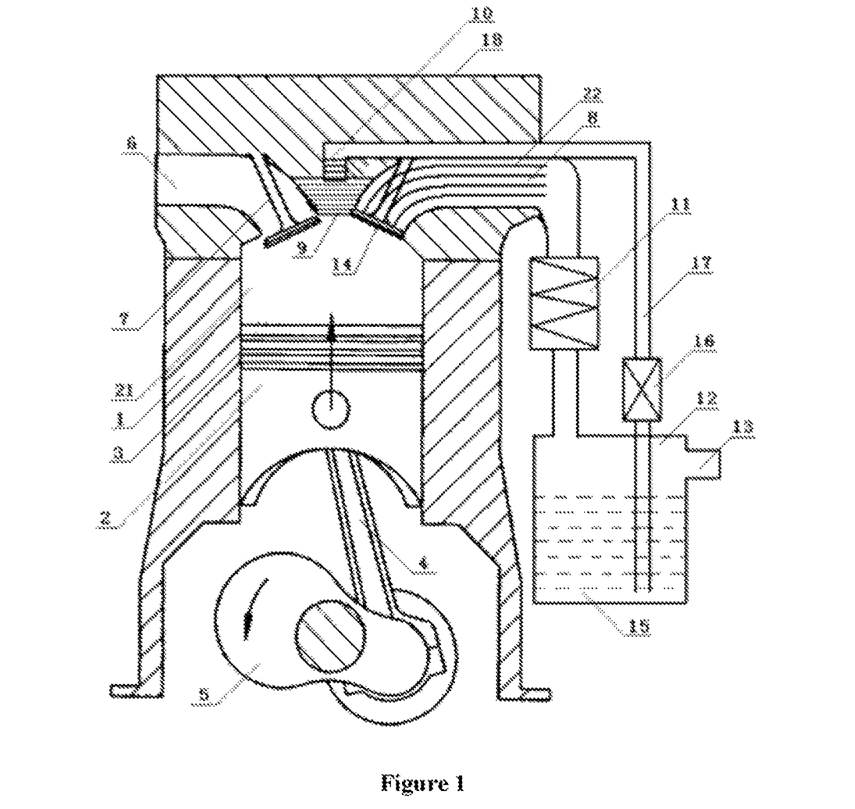
FIG. 1 is the structural schematic diagram of the efficient thermal energy power equipment of the present invention.

An efficient thermal energy power engine includes cylinder body 1, piston 2, piston ring 3, connecting rod 4, crankshaft 5, air inlet passage 6, intake valve 7, exhaust passage 8, gasification reactor 9, atomizer 10, cooler 11, liquid storage tank 12, exhaust port 13, exhaust valve 14, working medium 15, pressure pump 16, pipe 17, cylinder head 18, gasifying plate 19, gas hole 20, combustion chamber 21, and heat absorbing plate 22.

Cylinder body 1 is provided with combustion chamber 21 and piston 2. Piston 2 is provided with piston ring 3. Piston ring 3 is movably connected to connecting rod 4. Connecting rod 4 is connected to crankshaft 5. Cylinder head 18 is provided on an upper portion of cylinder body 1. Cylinder head 18 is provided with air inlet passage 6, exhaust passage 8, gasification reactor 9, and atomizer 10. Atomizer 10 is provided above gasification reactor 9. Air inlet passage 6 is provided with intake valve 7. Exhaust passage 8 is provided with exhaust valve 8. Gasifying plate 19 is provided with gas hole 20. Gasifying plates 19 are arranged on cylinder head 18 with a particular gap. Gas holes 20 are arranged evenly, in an array or staggered arrangement in gasifying plate 19. An upper portion of gasification reactor 9 is connected to atomizer 10. Atomizer 10 is connected to pressure pump 16 through pipe 17. Pressure pump 16 is connected to liquid storage tank 12 through pipe 17. Liquid storage tank 12 is connected to cooler 11 through pipe 17. Cooler 11 is connected to exhaust passage 8 through pipe 17. Liquid storage tank 12 is provided with exhaust port 13. Working medium 15 is provided in liquid storage tank 12. Pipe 17 inside liquid storage tank 12 extends to the bottom. After heat absorbing plate 22 is provided in the direction of the parallel air flow inside exhaust passage 8, the diameter of exhaust passage 8 is enlarged, such that the resistance of heat absorbing plate 22 is canceled, and the original exhaust ratio of cylinder body 1 and exhaust passage 8 can be maintained. Heat absorbing plate 22 absorbs the thermal energy from the exhaust and passes the thermal energy to gasification reactor 9 and cylinder head 18. Internal combustion engine cylinder body 1 is wrapped with an insulation layer. The arrangement of the gaps between heat absorbing plates 22 does not affect the exhausting of original cylinder. The gaps between heat absorbing plates 22 are arranged to be 1.2 mm. Preferably, the gaps between heat absorbing plates 22 are arranged to be 1.5 mm. Further preferably, the gaps between heat absorbing plates 22 are arranged to be 2 mm. Further preferably, the gaps between heat absorbing plates 22 are arranged to be 2.5 mm. Moreover, in case of reducing the arranged number of heat absorbing plates 22, the thickness of heat absorbing plate 22 and the gap can be increased. When one layer of heat absorbing plate 22 is arranged, the thickness is 6 mm, and the gap is 6 mm. Preferably, two layers of heat absorbing plates 22 are provided, wherein the thickness is 4.5 mm, and the gap is 4.5 mm. Further preferably, three layers of heat absorbing plates 22 are provided, wherein the thickness is 2 mm and the gap is 2 mm.

Embodiment 2

Figure 2:
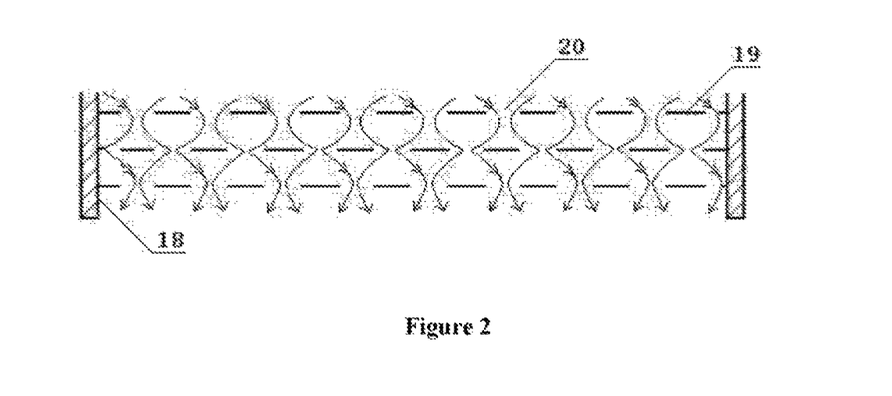
FIG. 2 is the profile view of the gasifying plate of the present invention.
Figure 3:
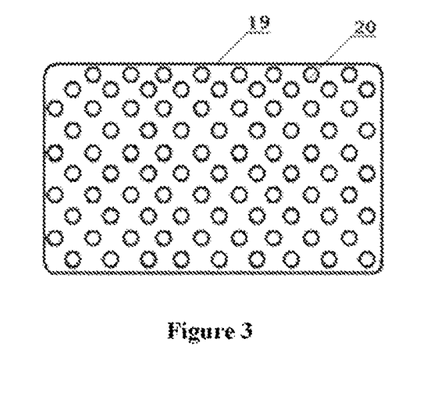
FIG. 3 is the front view of the gasifying plate of the present invention.
Figure 4:
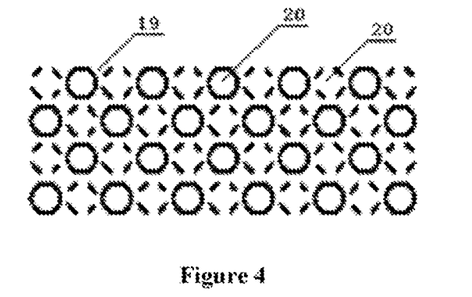
FIG. 4 is the diagram of the staggered arrangement of gas holes in two adjacent layers of gasifying plates of the present invention.
Figure 5:
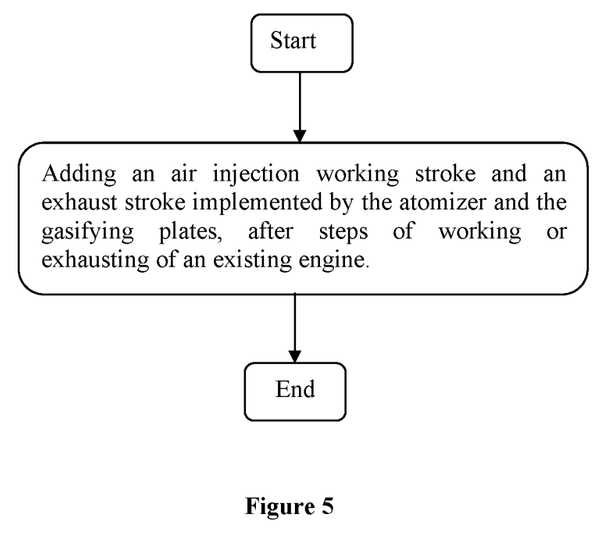
FIG. 5 is the flow chart of a working method of the efficient thermal energy power engine of the present invention.

The efficient thermal energy power engine as described in Embodiment 1, the internal combustion engine cylinder head is provided with one to six layers of gasifying plates 19. The gap between gasifying plates 19 is 1.2 mm, 1.5 mm, 1.8 mm, 2 mm, 2.5 mm, 2.8 mm, 3 mm, 3.6 mm, 3.8 mm, 4 mm, 4.2 mm, 4.5 mm, 4.8 mm, 5 mm, 5.5 mm, or 6 mm. The gap between gasifying plates 19 is set according to the number of layers and the thickness of gasifying plates. The larger the gap between gasifying plates 19, the thicker the gasifying plates 19. The larger the diameter of gas hole 20, the less layers of gasifying plates 19. The smaller the gap between gasifying plates 19, the thinner the gasifying plates 19. The smaller the diameter of gas hole 20, the more layers of gasifying plates 19. Gasifying plates 19 arranged with a particular gap and gas holes 20 in gasifying plates 19 are arranged in a staggered arrangement. Preferably, three layers of gasifying plates 19 arranged with a particular gap are provided at the Top Dead Center (TDC) of the internal combustion engine cylinder. The gap between the three layers of gasifying plates 19 is 1.5 mm, 1.8 mm, 2 mm, 2.5 mm, 2.8 mm, 3 mm, 3.6 mm, or 3.5 mm. The size of the gas hole is set as follows. The diameter of the gas hole in the upper layer of gasifying plate is half of the diameter of the gas hole in the adjacent lower layer of gasifying plate. The diameter of the gas hole in the first layer of gasifying plate is half of the diameter of the gas hole in the second layer of gasifying plate. The diameter of the gas hole in the second layer of gasifying plate is half of the diameter of the gas hole in the third layer of gasifying plate. Further preferably, the diameter of the gas hole in the first layer of gasifying plate is 0.2 mm, 0.3 mm, 0.4 mm, 0.5 mm, 0.8 mm, 1 mm, 1.2 mm, 1.5 mm, 1.8 mm, 2 mm, 2.5 mm, 3 mm, or 3.5 mm. The diameter of the gas hole in the second layer of gasifying plate is 0.4 mm, 0.6 mm, 0.8 mm, 1 mm, 1.6 mm, 2 mm, 2.4 mm, 3 mm, 3.6 mm, 4 mm, 5 mm, 6 mm, or 7 mm. The diameter of the gas hole in the third layer of gasifying plate is 0.8 mm, 1.2 mm, 1.6 mm, 2 mm, 3.2 mm, 4 mm, 4.8 mm, 6 mm, 7.2 mm, 8 mm, 10 mm, 12 mm, or 14 mm. The thickness of the gasifying plate is 0.4 mm, 0.6 mm, 0.8 mm, 1 mm, 1.6 mm, 2 mm, 2.4 mm, 3 mm, 3.6 mm, 4 mm, 5 mm, or 6 mm. The internal combustion engine cylinder and the gasifying plates are both made of thermal conductive metal material, which has a heat conductivity coefficient more than 300 W/m·K. Alloys of gold, silver, or copper are preferred.

The efficient thermal energy power engine as described in Embodiment 1 or Embodiment 2 can be manufactured as single-cylinder, dual-cylinder, multi-cylinder engine. With different working media, the utilization rate of the thermal energy is different. The structure of the present invention can be designed to be used in the gasoline engine, the diesel engine, the substitute fuel engine if necessary.

What is claimed is:
1. An efficient thermal energy power engine, comprising:
a gasification reactor, provided on a cylinder head of an internal combustion engine, the gasification reactor including a plurality of gasifying plates, a plurality of gas holes in the gasifying plate, and an atomizer above the gasifying plate, wherein the gasifying plates are provided on the cylinder head with a first gap, wherein the gas holes are distributed evenly, in an array, or in a staggered arrangement in the gasifying plates, an upper portion of the gasification reactor being connected to the atomizer, the atomizer being connected to a pressure pump through a pipe, the pressure pump being connected to a liquid storage tank through the pipe, the liquid storage tank being connected to a cooler through the pipe, the cooler being connected to an exhaust passage through the pipe, wherein a working medium is provided in the liquid storage tank, and the liquid storage tank is provided with an exhaust port;

a plurality of heat absorbing plates, provided in a direction of parallel air flow inside the exhaust passage, wherein the exhaust passage is connected to a cylinder body of the internal combustion engine, wherein thermal energy absorbed by the heat absorbing plates from exhaust gas is passed to the gasification reactor and the cylinder head.

2. The efficient thermal energy power engine of claim 1, wherein the diameter of the exhaust passage with the heat absorbing plates is larger than the diameter of the exhaust passage without the heat absorbing plates, such that an increased resistance from the heat absorbing plates is canceled, maintaining an original exhaust ratio of the cylinder body and the exhaust passage.

3. The efficient thermal energy power engine of claim 2, wherein the heat absorbing plates are arranged with a second gap, which does not affect an exhaust of an original cylinder; the second gap between the heat absorbing plates being arranged as 1.2-6 mm, a thickness of the heat absorbing plates being 0.2-6 mm; the cylinder head on the internal combustion engine being provided with at least one layer of gasifying plate.

4. The efficient thermal energy power engine of claim 3, wherein the first gap between the gasifying plates is 1.2-6 mm; the gas holes in one gasifying plate and the gas holes in an another gasifying plate are arranged in a staggered manner; the cylinder head of the internal combustion engine being provided with three layers of gasifying plates; the first gap between the three layers of gasifying plate being 1.5-3.5 mm; the size of the gas holes is arranged that a diameter of the gas hole in an upper layer of gasifying plate is half of a diameter of the gas holes in an adjacent lower layer of gasifying plate.

5. The efficient thermal energy power engine of claim 4, wherein a diameter of the gas holes in a first layer of gasifying plate is half of a diameter of the gas holes in a second layer of gasifying plate, and the diameter of the gas holes in the second layer of gasifying plate is half of a diameter of the gas holes in a third layer of gasifying plate.

6. The efficient thermal energy power engine of claim 5, wherein the diameter of the gas holes in the first layer of gasifying plate is 0.2-3.5 mm; the diameter of the gas holes in the second layer of gasifying plate being 0.4-7 mm; the diameter of the gas holes in the third layer of gasifying plate being 0.8-14 mm; the thickness of the gasifying plates being 0.2-6 mm; the cylinder body of the internal combustion engine, the heat absorbing plates, the cylinder head, and the gasifying plates are all made of thermal conductive metal material.

7. The efficient thermal energy power engine of claim 1, wherein the heat absorbing plates are arranged with a second gap, which does not affect an exhaust of an original cylinder; the second gap between the heat absorbing plates being arranged as 1.2-6 mm, a thickness of the heat absorbing plates being 0.2-6 mm; the cylinder head on the internal combustion engine being provided with at least one layer of gasifying plate.

8. The efficient thermal energy power engine of claim 7, wherein the first gap between the gasifying plates is 1.2-6 mm; the gas holes in one gasifying plate and the gas holes in an another gasifying plate are arranged in a staggered manner; the cylinder head of the internal combustion engine being provided with three layers of gasifying plates; the first gap between the three layers of gasifying plate being 1.5-3.5 mm; the size of the gas holes is arranged that a diameter of the gas hole in an upper layer of gasifying plate is half of a diameter of the gas holes in an adjacent lower layer of gasifying plate.

9. The efficient thermal energy power engine of claim 8, wherein a diameter of the gas holes in a first layer of gasifying plate is half of a diameter of the gas holes in a second layer of gasifying plate, and the diameter of the gas holes in the second layer of gasifying plate is half of a diameter of the gas holes in a third layer of gasifying plate.

10. The efficient thermal energy power engine of claim 9, wherein the diameter of the gas holes in the first layer of gasifying plate is 0.2-3.5 mm; the diameter of the gas holes in the second layer of gasifying plate being 0.4-7 mm; the diameter of the gas holes in the third layer of gasifying plate being 0.8-14 mm; the thickness of the gasifying plates being 0.2-6 mm; the cylinder body of the internal combustion engine, the heat absorbing plates, the cylinder head, and the gasifying plates are all made of thermal conductive metal material.

11. A working method of the efficient thermal energy power engine of claim 1, comprising:

adding an air injection working stroke and an exhaust stroke implemented by the atomizer and the gasifying plates, after steps of working or exhausting of an existing engine.

12. The working method of the efficient thermal energy power engine of claim 11, wherein each working cycle of a six-stroke engine includes an intake stroke, a compression stroke, a working stroke, a first exhaust stroke, an air injection working stroke, and a second exhaust stroke, wherein in order to complete one working cycle of the six-stroke engine, a piston in a cylinder needs to go back and forth in six strokes, and a crankshaft rotates for three times.

13. The working method of the efficient thermal energy power engine of claim 12, wherein the internal combustion engine is a gasoline engine, a diesel engine, or a substitute fuel engine; and the internal combustion engine is a dual-stroke engine, a four-stroke engine, a six-stroke engine, or engines with other strokes, being added with the air injection working stroke and the exhaust stroke.

14. The working method of the efficient thermal energy power engine of claim 13, wherein in the air injection working stroke, a working medium is atomized through the atomizer on the cylinder head, and enters a first layer of gasifying plate, the thermal energy passes through the cylinder and the first layer of gasifying plate such that an atomized organic working medium is gasified quickly, an atomized gas and a gasified organic working medium enter a second layer of gasifying plate to be gasified continuously, after a certain air pressure is formed, the atomized gas and the gasified working medium enter a third layer of gasifying plate and are gasified continuously so as to push the piston to work; wherein since a diameter of the gas holes increases layer by layer from the first layer to the third layer, an expanding rate of the gasified organic working medium speeds up step by step, and an air pressure increases gradually, pushing the piston to work again, the piston pushes the exhaust to be discharged after working.

15. The working method of the efficient thermal energy power engine of claim 11, wherein the internal combustion engine is a gasoline engine, a diesel engine, or a substitute fuel engine; and the internal combustion engine is a dual-stroke engine, a four-stroke engine, a six-stroke engine, or engines with other strokes, being added with the air injection working stroke and the exhaust stroke.

16. The working method of the efficient thermal energy power engine of claim 15, wherein in the air injection working stroke, the working medium is atomized through the atomizer on the cylinder head, and enters a first layer of gasifying plate, the thermal energy passes through the cylinder and the first layer of gasifying plate such that an atomized organic working medium is gasified quickly, an atomized gas and a gasified organic working medium enter a second layer of gasifying plate to be gasified continuously, after a certain air pressure is formed, the atomized gas and the gasified working medium enter a third layer of gasifying plate and are gasified continuously so as to push a piston to work; wherein since a diameter of the gas holes increases layer by layer from the first layer to the third layer, an expanding rate of the gasified organic working medium speeds up step by step, and an air pressure increases gradually, pushing the piston to work again, the piston pushes the exhaust to be discharged after working.

\* \* \* \* \*